United States Patent
Singh et al.

(10) Patent No.: US 7,192,563 B2
(45) Date of Patent: Mar. 20, 2007

(54) PROCESS FOR RECOVERY OF HIGH PURITY URANIUM FROM FERTILIZER GRADE WEAK PHOSPHORIC ACID

(75) Inventors: Harvinderpal Singh, Trombay (IN); Shyamkant Laxmidutt Mishra, Trombay (IN); Anitha Mallavarapu, Trombay (IN); Vijayalakshmi Ravishankar, Trombay (IN); Ashok Baswanthappa Giriyalkar, Trombay (IN); Manojkumar Kedarnath Kotekar, Trombay (IN); Tapan Kumar Mukherjee, Mumbai (IN)

(73) Assignee: Secretary, Department of Atomic Energy, Government of India, Mumbai (IN)

( * ) Notice: Subject to any disclaimer, the term of this patent is extended or adjusted under 35 U.S.C. 154(b) by 470 days.

(21) Appl. No.: 10/486,507

(22) PCT Filed: Mar. 31, 2002

(86) PCT No.: PCT/IN03/00132

§ 371 (c)(1),
(2), (4) Date: Feb. 11, 2004

(87) PCT Pub. No.: WO2004/087971

PCT Pub. Date: Oct. 14, 2004

(65) Prior Publication Data

US 2004/0247504 A1    Dec. 9, 2004

(51) Int. Cl.
*C01G 56/00*    (2006.01)
*C01G 57/00*    (2006.01)
*C01G 1/02*    (2006.01)
*C01G 43/01*    (2006.01)
*C22B 60/02*    (2006.01)

(52) U.S. Cl. ............... 423/3; 423/2; 423/10; 423/11; 423/16; 423/260; 423/261

(58) Field of Classification Search ............... 423/2, 423/3, 10, 11, 16, 260, 261
See application file for complete search history.

(56) References Cited

U.S. PATENT DOCUMENTS

| 4,258,013 A | 3/1981 | Pyrih et al. |
| 4,302,427 A | 11/1981 | Berry et al. |
| 4,649,029 A | 3/1987 | Nirdosh |

FOREIGN PATENT DOCUMENTS

FR    2 352 062    12/1977

*Primary Examiner*—Steven Bos
*Assistant Examiner*—James Fiorito
(74) *Attorney, Agent, or Firm*—Merchant & Gould P.C.

(57) ABSTRACT

A two-cycle countercurrent extraction process for recovery of highly pure uranium from fertilizer grade weak phosphoric acid. The proposed process uses selective extraction using di-(2-ethyl hexyl) phosphoric acid (D2EHPA) and tri-n-butyl phosphate (TBP) with refined kerosene as synergistic extractant system on hydrogen peroxide treated phosphoric acid, and stripping the loaded extract with strong phosphoric acid containing metallic iron to lower redox potential. The loaded-stripped acid is diluted with water back to weak phosphoric acid state and its redox potential raised by adding hydrogen peroxide and re-extracted with same extractant system. This extract is first scrubbed with sulfuric acid and then stripped with alkali carbonate separating iron as a precipitate, treated with sodium hydroxide precipitating sodium uranate, which is re-dissolved in sulfuric acid and converted with hydrogen peroxide to highly pure yellow cake of uranium peroxide.

24 Claims, No Drawings

PROCESS FOR RECOVERY OF HIGH PURITY URANIUM FROM FERTILIZER GRADE WEAK PHOSPHORIC ACID

FIELD OF THE INVENTION

The present invention relates to a process for the recovery of high purity uranium from fertilizer grade phosphoric acid. This invention particularly relates to an improved process for the recovery of high purity uranium from the weak phosphoric acid generated from phosphate rocks during the manufacture of phosphatic fertilizers. This invention more particularly relates to a process for extraction of high purity uranium from weak phosphoric acid, using a selective extractant in synergistic combination with a reagent, and without impairing the quality of the fertilizer grade phosphoric acid returned as raffinate—aqueous stream from which the metal value has been extracted.

BACKGROUND AND PRIOR ART

Primarily, uranium is obtained from uranium ores. A secondary source for uranium is sedimentary phosphate deposits. Most of these deposits, worldwide are uraniferous containing from about 50 to 200 ppm uranium. Both these source materials, uranium ore or phosphate rock, are often leached with sulfuric acid. While uranium ore gives soluble sulfates of uranium in a dilute (~0.01 M) acidic leach solution, the phosphate rock produces more concentrated (>4 M) phosphoric acid which is used to make fertilizers and/or detergent phosphates.

During the wet process of producing phosphoric acid, many impurities in the phosphate rock including the uranium values and significant amounts of the rare earths in the rock get solubilized as complex phosphates. While the uranium values in the phosphoric acid can be recovered by solvent extraction from the phosphoric acid obtained at various stages of its preparation, rare earths remain in the phosphoric acid.

Generally, two types of phosphoric acids one called weak acid when $P_2O_5$ content is up to 30% by wt. (~5.5 M) and another called strong acid when $P_2O_5$ content is between 30–55% by wt. (5.5–13 M) are available for the recovery of the uranium.

The efficiency and techno-economic feasibility of the recovery of uranium depends on the proper choice of the solvents employed for the type of phosphoric acid chosen. Further, the nature and the amount of the impurities such as fluorine, iron, aluminum, silica, magnesium, rare earths, and compounds of other minor elements solubilized in the phosphoric acid influence the purification/extraction steps to obtain uranium of desired quality.

U.S. Pat. No. 4,238,457(1980), U.S. Pat. No. 4,302,427 (1981), and U.S. Pat. No. 4,778,663(1988) disclose the extraction involving D2EHPA-TOPO as extractant. This process is characterized by high selectivity. However, it uses a relatively expensive extractant component TOPO, which is also not readily available worldwide. This process uses a dual cycle process for extraction of oxidized uranium; but in view of the high synergism of TOPO and high selectivity, the co-extraction of iron and rare earths is not a particular feature of this process.

The known dialkyl phosphoric acid extraction or 'DAPEX Process' extracts uranium from acid leach solutions derived from uranium ores and not from phosphate rocks. This process has been described by Blake et. al. In ORNL—Report 2172, Jan 1957 for recovery of uranium by solvent extraction of leach solution obtained from sulfuric acid leached uranium ore and not from phosphate rocks.

The process uses dilute ~0.1 M solution of D2EHPA and tri-n-butyl phosphate (TBP) in nearly equi-molar ratio diluted with kerosene for extraction of uranium. The absence of phosphate ions helps in efficient extraction of uranium with this extractant system. However, such extraction solvent is known to be not suitable for extraction of uranium in the process of phosphate ions. Thus, the DAPEX process could not be used for recovering pure uranium from weak or strong phosphoric acid available in phosphatic fertilizer industry.

Florin T. Bunus in his paper entitled "Determination of low levels of uranium in solutions obtained by acid attack on phosphate rock" by in *Talanta*, 1977,24, 117–120 suggests to check the application of the spectrophotometric and X ray fluorescence methods on the industrial phosphoric acid solutions, the extraction of uranium using 1.2 M D2EHPA with 0.15 M TBP in kerosene, from sodium chlorate oxidized (about 4.3 M) phosphoric acid. The uranium was stripped with 8.6 M phosphoric acid containing Fe(II). The Bunus procedure is basically an analytical method and does not apply to extraction from industrial phosphoric acid which include rare earths which contaminate the product and affect re-use of extracting solvent.

F. Bunus, I. Miu and R. Dumitrescu, in "Simultaneous recovery and separation of uranium and rare earths elements from phosphoric acid in a one-cycle extraction-stripping process"; Hydrometallurgy, 35(1994) 375–389) also known as the Romanian process proposes one cycle D2EHPA/TBP-HF process to produce a crude concentrate of uranium. The crude uranium cake is further refined in another plant. The process is, however, disadvantageous for the following reasons:

i. Use of corrosive and hazardous hydrofluoric acid (HF).
ii. Poor quality of both the products obtained namely the uranium and rare earths which therefore require further processing.
iii. The phosphoric acid contaminated with hydrofluoric acid is returned to the fertilizer plant. This requires special pollution control measures during fertilizer production.

A two stage precipitation of uranium (the French process) is disclosed in "A New Unit for Purification of Uranium Solution in the Lodeve Mill"; G. Lyaudet, P. Michel, J. Moret and J. M. Winter, IAEA1987). This process particularly describes a multiple step process for recovering pure uranium peroxide from aqueous solutions obtained in the uranium leaching from concentrated uranium materials that are contaminated with organics, zirconium, molybdenum etc.

However, such a process is not relevant when the starting carbonate solution for recovery of uranium is obtained not directly from the leaching of uranium ores but obtained through a solvent extraction step from phosphoric acid where the separation of molybdenum and zirconium are not relevant.

OBJECT OF THE INVENTION

It is thus the basic object of the present invention is to provide a process for efficient recovery of high purity uranium substantially free from rare earths present in the weak phosphoric acid which would be suitable for extraction of uranium in the presence of phosphate ions and importantly avoid the prior art drawbacks and will not substantially affect the quality of the phosphoric acid and fertilizers produced therefrom.

Another object is to provide for a process for recovery of uranium from weak phosphoric acid involving a relatively stable, cost effective and easily available extracting solvent.

Yet further object of the present invention is to provide for an improved process for the extraction of uranium from weak phosphoric acid, which would have high purity and good yield and yet avoid the complexities, and expenses involved in the conventional process for recovery of uranium from secondary sources.

Yet further object of the present invention is directed to provide for an improved process for the extraction of uranium, from weak phosphoric acid which would not involve harmful/corrosive chemicals and thus avoid contamination of the phosphoric acid and have it in acceptable form for use in the fertilizer industry.

SUMMARY OF THE INVENTION

Accordingly the present invention relates to a process for recovery of high purity uranium from fertilizer grade weak phosphoric acid comprising:
a) first cycle of extraction from said weak phosphoric acid using a selective extracting solvent obtained of a synergistic extractant system having 1 M to 1.6 M D2EHPA and 0.1 to 0.3 M TBP, with the molar proportion of D2EHPA:TBP in the range of 10:1 to 5:1 in refined kerosene, followed by reductive stripping of the loaded extract-I with 11–14 M strong phosphoric acid;
b) second cycle of extraction comprising extraction of the stripped strong phosphoric acid after diluting it with water to the strength of the starting weak phosphoric acid and treating that with the oxidizing agent(s), using a selective extracting solvent obtained of the said synergistic extractant system; followed by
c) scrubbing of the loaded extract-II with 4.5–5.5 M sulfuric acid; and
d) stripping it with a solution of alkali carbonate and recovering therefrom the uranium values.

Also, preferably prior to subjecting the weak phosphoric acid to the first cycle extraction; the same is pretreated by cooling, the same is pretreated by cooling, clari-flocculation, activated carbon adsorption and treatment with oxidizing agents.

In the above process of the invention, the extractant system used is preferably comprised of 1 Vol. of the D2EHPA and TBP first two ingredients: 1 to 2 Vol. of refined kerosene.

Also, the recovery of the uranium values from extracted carbonate strippings as highly pure uranium peroxide is preferably carried out in two steps first treating the said carbonate strippings with alkali collecting the precipitate and then re-dissolving it in 3–4 M. sulfuric acid and adjusting pH to 3.5 and then treating it with hydrogen peroxide to precipitate highly pure uranium peroxide; and optionally drying and calcining said uranium peroxide at 180–220° C. to obtain stable highly pure uranium oxide.

In accordance with a preferred aspect, the process for recovery of high purity uranium from fertilizer grade weak phosphoric acid comprise:
 i. pretreatment of weak phosphoric acid comprising cooling, clari-flocculation, activated carbon adsorption and treatment with oxidizing agent(s);
 ii. first cycle of extraction using an extracting solvent-I in the group of solvents in a synergistic selective extractant system—di(2-ethyl hexyl) phosphoric acid (D2EHPA)/tri-n-butyl phosphate (TBP)/refined kerosene, prepared by mixing 1 M to 1.6 M D2EHPA and 0.1 to 0.3 M TBP, with the molar proportion of D2EHPA:TBP in the range of 10:1 to 5:1 in refined kerosene, in the ratio of 1 vol. of the first two ingredients: 1–2 vol. of kerosene; and reductive stripping of the loaded extract-I with 11–14 M strong phosphoric acid;
 iii. second cycle of extraction comprises extraction of the stripped strong phosphoric acid after diluting it with water to the strength of the starting weak phosphoric acid and treating that with the oxidizing agent(s), using extracting solvent-II of the said extractant system; followed by the scrubbing of the loaded extract-II with 4.5–5.5 M sulfuric acid; and then stripping it with a solution of alkali carbonate;
 iv. the recovery of the extracted uranium in the carbonate stripped solution as highly pure uranium peroxide in two steps first treating the said carbonate stripped solution with alkali collecting the precipitate and then re-dissolving it in 3–4 M sulfuric acid and adjusting pH to 3.5 and then treating it with hydrogen peroxide to precipitate highly pure uranium peroxide; and optionally drying and calcining said uranium peroxide at 180–220° C. to obtain stable highly pure uranium oxide.

DESCRIPTION OF THE INVENTION

In accordance with a preferred aspect of the present invention there is provided a process for recovery of uranium from weak phosphoric acid (containing 1% to 30% $P_2O_5$, sulfuric acid and other metallic salts and rare earths), formed such as by sulfuric acid leaching of phosphate rocks in a fertilizer industry comprising of the following:

A—Pretreatment

Subjecting said weak phosphoric acid first to a step of cooling to 25–30° C. followed by clari-flocculation for removal of suspended solids by the addition of a flocculating agent selected from polymers of the anionic polyacrylamide type with molecular weight of 4 to 8 million; separating out solids and treating the clarified phosphoric acid first with activated carbon to remove organic matter like humic acids and then treated with oxidizing agents for complete oxidation of uranium—U(IV) to U(VI). Oxidizing agents are selected from the group of oxidizing agents that will not affect phosphoric acid for use as a fertilizer, such as hydrogen peroxide, oxygen, air bubbling or air bubbling followed by treatment with hydrogen peroxide so that the redox potential of the treated phosphoric acid is above 350 mV. Hydrogen peroxide is a preferred oxidizing agent.

B—First Cycle Extraction

The extraction from the pretreated phosphoric acid is done in oxidized state of uranium when it is extracted better in the extractant system selected as said above. The uranium in pretreated phosphoric acid is extracted using extracting solvent-I, the ratio of the phosphoric acid-forming aqueous phase-I, to the extracting solvent-I-forming organic phase-I, is from 1:0.8 to 1:0.33; preferably it is from 1:0.5 to 1:0.33. This process preferably comprises at least 6 stages of counter current extraction. Generally from 4 to 10 stages of counter current extractions are sufficient. Under these conditions of extraction, D2EPHA/TBP extractant selectively extracts major proportion of U (VI) complexes and significant amounts of iron and rare earths from the phosphoric acid. The organic phase containing uranium at the end of extraction is called loaded extract.

The loaded extract is stripped in 4 to 8 stages at 30–60° C. using 11–14 M (with respect to $H_3PO_4$) industrial fertilizer grade phosphoric acid containing $FE^{2+}$ ions such that the redox potential is less than 100 mV. For this purpose extra metallic iron is added to this stripping acid. This stripping phosphoric acid need not be free of rare earths/uranium. This reductive stripping with strong phosphoric acid at the end of cycle-I brings both uranium and rare earths in to the stripping strong phosphoric acid aqueous phase from the organic phase and regenerates the extracting solvent-I for re-use.

In a typical process the first cycle of extraction comprising an eight stage counter current extraction using 1.5 M D2EHPA and 0.2 M TBP and stripping the loaded extract-I in six stages at 50–60° C. using 11–14 M (w.r.t. $H_3PO_4$) industrial fertilizer grade phosphoric acid, containing $Fe^{2+}$ ions such that redox potential is <100 mV.

C: Second Cycle Extraction

The stripped acid is diluted with water to bring its $P_2O_5$ levels to less than 30% by wt. thereby making the strong phosphoric acid into weak phosphoric acid for second extraction. It is re-oxidised to redox potential >350 mV with an oxidizing agent preferably hydrogen peroxide again for complete oxidation of uranium—U(IV) to U(VI), and bulk of Fe (II) to FE (III). Thus at this stage second cycle extraction conditions are like the first cycle extraction. The main difference is the uranium contents are enriched due to lesser amounts of stripping acid used.

The diluted and oxidised stripped acid is subjected to second cycle of extraction with extracting solvent-II, which is of the same group as the extractant system-I but may be same or different from the exact composition of the extracting solvent-I used in the first cycle. For example if in the first cycle it is 1.5 M D2EHPA and 0.2 M TBP in the second cycle it is 1.2 M D2EHPA and 0.15 M TBP. In particular the molar ratio of D2EHPA to TBP in the extracting solvent-II is selected with regard to parameters such as: (a) high uranium extraction accompanied by low extraction of iron and rare earths, (b) ease of selective scrubbing of impurities that get co-extracted, and (c) ensuring complete miscibility of the organic phase when contacted with alkaline solution for stripping. However, extraction with the same solvent in both the cycles has the advantage of simplicity in the operations in the plant. The ratio of the diluted phosphoric acid after stripping and treating with oxidizing agent-forming aqueous phase-II, to the extracting solvent-II-forming organic phase-II, is from 1:0.125 to 1:1; preferably it is from 1:0.25 to 1:0.5 and the extractions are done in counter current manner in 6–10 stages preferably in 8 stages; the scrubbing of the loaded extract-II of the second cycle, is done with $\frac{1}{3}^{rd}$ to $\frac{1}{5}^{th}$ volume of ~5.5 M sulfuric acid at 25–30° C. for 0.5–3 minutes contact and stripping the scrubbed loaded extract-II with the ½ to $\frac{1}{10}^{th}$ vol. of alkali carbonate solution (10–20% wt./vol.) and separating out the precipitated iron hydroxides to get clear sodium carbonate solution containing uranium values.

The loaded extract-II of the second cycle, is scrubbed with ~5.5 M sulfuric acid for taking the rare earths in the sulfuric acid phase leaving uranium values in the organic phase This scrubbing with sulfuric acid in cycle-II is effective because of use of higher strength phosphoric acid for stripping in the first cycle extract, which strips rare earths. Therefore, advantageously the process of the invention could avoid the need for use of hydrofluoric acid.

In this process the next step of second cycle is alkali carbonate stripping of the organic phase with alkali carbonate solution (10–20% wt./vol.) to transfer uranium from organic phase to aqueous phase and while doing this iron gets precipitated. The precipitated iron hydroxides are filtered out to get clear sodium carbonate solution containing uranium values.

In accordance with further preferred aspect of the present invention the same provides for improved recovery of uranium from the carbonate solution as discussed as hereunder.

D. Recovery Of Uranium From The Carbonate Solution

The carbonate solution containing uranium is made alkaline with addition of sodium hydroxide of 10–12 M to precipitate sodium diuranate and the precipitated sodium diuranate is separated by filtration, centrifuging etc., and after collecting it is dissolved in sulfuric acid 15–20% by wt. in 1:1 proportion. The pH of the solution is adjusted to 3.5 ±0.1 by addition of required quantity of 2.5–M sodium hydroxide or ammonium hydroxide. This is followed by the addition of 25–50% wt/wt. hydrogen peroxide preferably 30–50% by wt. and 10–20% excess over the stoichiometric requirement to precipitate uranium peroxide. It is separated by filtration or centrifuging. On filtration and washings, yellow cake is obtained. This is air dried. The yellow cake collected as highly pure uranium peroxide.

This hydrated uranium peroxide is converted, if required, to the more stable pure uranium trioxide of high purity by drying at 180 to 250° C. for 15–60 minutes; preferably at 200–210° C. for 30–45 minutes.

Following the above selective process of the invention the overall recovery of uranium is in the range of 90 to 95%, and purity >95%.

EXAMPLES

The invention is described hereunder in greater detail in relation to non-limiting examples. The examples are by the way of illustration only and in no way restrict the scope of the invention.

Materials And Equipment Used

1. Starting Material

Weak phosphoric acid formed in a fertilizer plant wherein phosphate rock was leached with sulfuric acid was the starting material. The different batches used had significant variation in the composition as shown in Table 1

TABLE 1

Analysis of Weak Phosphoric Acid Used For Extraction of Uranium

| Item | Acid-1 | Acid-2 | Acid-3 | Acid-4 |
|---|---|---|---|---|
| % $P_2O_5$ | 27.72 | 29.29 | 23.29 | 28.0 |
| % $H_2SO_4$ | 2.02 | 2.18 | 1.72 | 3.3 |
| % F | 1.78 | 0.85 | 0.99 | 2.1 |
| % $Al_2O_3$ | 0.59 | 0.04 | 0.05 | 0.6 |
| % $Fe_2O_3$ | 0.67 | 0.14 | 0.12 | 0.8 |
| % MgO | 0.42 | 0.16 | 0.17 | 0.04 |

TABLE 1-continued

Analysis of Weak Phosphoric Acid Used For Extraction of Uranium

| Item | Acid-1 | Acid-2 | Acid-3 | Acid-4 |
|---|---|---|---|---|
| % $Na_2O$ | 0.12 | 0.04 | 0.06 | 0.1 |
| % $K_2O$ | 0.05 | 0.01 | 0.02 | 0.04 |
| % Cl | 0.03 | 0.16 | 0.15 | 0.08 |
| Density, g/l | 1.32 | 1.28 | 1.24 | 1.325 |
| Solids % | 1.00 | 0.49 | 0.66 | 1.1 |
| $H_3PO_4$ M | 5.16 | 5.40 | 4.07 | 5.23 |
| Uranium ppm | 128 | 117 | 82 | 135 |

2. Flocculating agent—locally available poly-acrylamide polymer of mol. wt. 7 million.
3. Activated carbon—granular carbon of 10/30 mesh and iodine number about 800.
4. Extracting solvents—I and II were prepared in a synergistic selective extractant system—D2EHPA/TBP/Refined kerosene, prepared by mixing ~3 M D2EHPA and ~3 M TBP, with the molar proportion of D2EHPA:TBP in the range of 10:1 to 5:1 in refined kerosene, in the ratio as illustrated in Table 2.

TABLE 2

Composition of Extracting Solvents used in the Example 5 % by vol.

| | Solvent-I | Solvent-II |
|---|---|---|
| D2EHPA | 54 | 54 |
| TBP | 6.3 | 6.3 |
| Refined Kerosene | 39.7 | 39.7 | these solvents of the extractant system 1.5 M D2EHPA, 0.2 M TBP and kerosene were prepared by blending together all the ingredients. The volume of the refined kerosene was kept nearly equal to the total volume of D2EHPA and TBP.

5. D2EHPA: Commercially indigenously available D2EHPA: of >95% purity and having <1% monoester was used. The required amount was calculated after titration of the D2EHPA to determine exact molarity.
6. TBP: Commercially indigenously available TBP of >99% purity was used. The required amount was calculated after analysis of the TBP molarity.
7. Kerosene: Commercially available normal heavy paraffin (NHP) fraction, having a flash point of ~94° C., was used.
8. Stripping Acid—Composition of strong phosphoric acid used for stripping the organic phase separated after the extraction in the first cycle in the Example 5 is given in Table 3. This acid was prepared by concentration of a weak acid such as one in Table-1.

TABLE 3

Composition of The Strong Acid (Density = 1.6 g/l)

| wt | % | gm/l | Molar |
|---|---|---|---|
| $P_2O_5$ | 50 | 800.00 | 5.64 |
| $SO_4$ | 2 | 32.00 | 0.33 |
| F | 0.3 | 4.80 | 0.25 |
| $SiO_2$ | 0.1 | 1.60 | 0.03 |
| $Al_2O_3$ | 0.3 | 4.80 | 0.05 |
| $Fe_2O_3$ | 0.35 | 5.60 | 0.04 |
| MgO | 0.4 | 6.40 | 0.16 |
| $Na_2O$ | 0.15 | 2.40 | 0.04 |
| CaO | 0.05 | 0.80 | 0.01 |

TABLE 3-continued

Composition of The Strong Acid (Density = 1.6 g/l)

| wt | % | gm/l | Molar |
|---|---|---|---|
| Cl | 0.01 | 0.16 | 0.00 |
| $H_3PO_4$ | 69.02 | 1104.35 | 11.27 |
| uranium | | 0.280 | |

Equipment Used

The equipment used for laboratory experiments were standard glassware of capacity varying from 50 ml to 3000 ml.

For continuous pilot plant runs, mixer-settlers made of acrylic and polypropylene of capacity up to 150l/hr were used. Metering pumps were used to control flow rates of aqueous and organic solutions.

EXAMPLE 1

Single Stage Extraction

A comparative study of the extraction of uranium achieved using the following known extractant combination and the selective extractant combination of the invention comprising 1.0–1.5 M DEHPA and 0.1–0.2 M TBP was carried out using the different phosphoric acids as shown in Table 1.

The role of TBP molarity in synergizing extraction by D2EHPA, of uranium from for a starting phosphoric acid was studied. The power of extraction of the solvent is expressed as a ratio of concentration of uranium in the organic phase to that in the aqueous phase. The results are given in Tables 4–6.

TABLE 4

Effect of TBP Molarity At Constant D2EHPA for Acid-1 = 5.16 M

| D2EHPA, | TBP, | POWER |
|---|---|---|
| 1.2 M | 0 | 1.63 |
| | 0.05 M | 1.86 |
| | 0.2 M | 2.32 |
| | 0.3 M | 1.86 |
| | 0.4 M | 1.74 |
| | 0.5 M | 1.54 |

TABLE 5

Effect of TBP Molarity At Constant D2EHPA for Acid-2 = 5.4 M

| D2EHPA, M | TBP, M | POWER |
|---|---|---|
| 1.5 | 0 | 1.72 |
| | 0.1 | 2.79 |
| | 0.15 | 2.51 |

TABLE 6

Effect of Extractant Molarity at D2EHPA:TBP = 1.5:0.2, Acid-3 = 4.07 M

| D2EHPA, M | TBP, M | POWER |
|---|---|---|
| 0.2 | 0.027 | 0.16 |
| 0.5 | 0.067 | 0.196 |

TABLE 6-continued

Effect of Extractant Molarity at D2EHPA:TBP = 1.5:0.2, Acid-3 = 4.07 M

| D2EHPA, M | TBP, M | POWER |
|---|---|---|
| 0.75 | 0.0997 | 2.14 |
| 1 | 0.133 | 2.52 |
| 1.5 | 0.2 | 7.8 |
| 2 | 0.26 | 18.5 |

The TBP strength required for maximum extracting power for a given phosphoric acid strength and the strength of the extractant D2EHPA as seen from the above Table 4–6 is in the range 1.2–1.5 M D2EHPA and 0.1–0.2 M TBP. The extractant system with 2.0 M D2EHPA and 0.2 M TBP is too viscous, more expensive and difficult in industrial scale operations. Hence, 1.5 M D2EHPA and 0.2 M TBP was considered optimum to give synergistically giving good extraction power to thereby yield very good recovery with 6 stages of counter current extractions.

EXAMPLE 2

Multiple Stage Extraction

Based on above single stage tests, several counter-current tests in multiple stages have been carried out on each of the four phosphoric acids described in Table-1. The extractions were carried out using 1.5 M D2EHPA and 0.2 M TBP as extractant system, at room temperature 29–31° C., with feed oxidized to >450 mV emf. The percentage uranium extracted at the end of each stage are given in Table 7

TABLE 7

Extraction % In Multistage Counter-Current Extraction

| Stage no | 1 | 2 | 3 | 4 | 5 | 6 | 7 | 8 |
|---|---|---|---|---|---|---|---|---|
| Acid 1 | 60 | 77 | 83 | 86 | 89 | 90 | 91 | 92 |
| Acid 2 | 33.1 | 53.1 | 66.2 | 76.2 | 81.5 | 85.4 | 87.7 | 93.8 |
| Acid 4 | 34.0 | 50.0 | 66.7 | 75.3 | 78.7 | 90.0 | 92.0 | 95.3 |
| Acid 3. | 68.8 | 78.6 | 83.0 | 87.5 | 89.3 | 93.8 | | |

From this example it is clear that depending on the acid quality 6–8 stages are adequate for more than 90% extraction.

EXAMPLE 3

Effect Of Acid Molarity Of Stripping Acid On The Stripping Power

The stripping power of the stripping acid on the loaded extract obtained using the extractant system comprising 1.5 M D2EHPA and 0.2 M TBP was studied. For this the phosphoric acid no. 4 (see Table 1) was diluted for preparing acids of lower molarities and was concentrated for preparing acids of higher molarities.

The results of this study are given in Table 8.

TABLE 8

Effect of Acid Molarity on the extraction of U VI with extractant system: 1.5 M D2EHPA + 0.2 M TBP

| Acid, M | POWER |
|---|---|
| <1 | >200 |
| 3 | 78 |
| 5.5 | 2.66 |
| 6 | 2.02 |
| 7 | 0.98 |
| 14 | <0.1 |

From the above table it is clear that extraction power is >2 for phosphoric acid is less than or equal to 6 M strength and the extraction is better when the phosphoric acid is more dilute, and the stripping is better when the stripping acid is concentrated.

EXAMPLE 4

Efficiency Of Phosphoric Acid For Stripping Rare Earths From

Loaded Extract Of The First Cycle

In this example the power of extracting rare earths from the loaded extract of the first cycle was studied. Equal volumes of loaded extracts and aqueous phase were contacted and equilibrated in a separating funnel. Concentrations of rare earths in each of the phase were determined after equilibrium by inductively coupled plasma (ICP) method. Effect of molarity of the phosphoric acid on the extraction of the rare earths is shown by the data for yttrium in Table 9:

TABLE 9

Effect of molarity of phosphoric acid on power for yttrium.

| M $H_3PO_4$ | Power |
|---|---|
| 3 | 78 |
| 5.5 | 2.66 |
| 6 | 2.02 |
| 7 | 0.98 |
| 8 | 0.17 |
| 10 | 0.026 |
| 12 | <0.005 |

Thus strong acid of >10 M is needed to ensure that rare earths are completely stripped.

EXAMPLE 5

Study of Sulfuric Acid Scrubbing Of Extract of $2^{nd}$ Cycle

In this example the power of sulfuric acid of strength 1.75–6.5 M for extracting yttrium from the loaded extract of the second cycle was studied. Equal volumes of loaded extracts and aqueous phase were contacted and equilibrated in a separating funnel. The concentrations of rare earths in each of the phase were determined after equilibrium by ion coupled plasma (ICP) method.

The results are given in Table 10.

TABLE 10

Effect of sulfuric acid scrubbing of extract of 2nd cycle.

| $H_2SO_4$ M | Power |
|---|---|
| 1.75 | 1.97 |
| 3.5 | 0.22 |
| 5.5 | 0.078 |
| 6.5 | 0.079 |

Thus strong sulfuric acid is needed in scrubbing to ensure that co-extracted yttrium gets transferred from organic to aqueous phase.

EXAMPLE 6

Process Of The Present Invention a. Pre-treatment of weak phosphoric acid

In this example weak phosphoric acid No 2 as shown in the Table 1(100 l) was cooled to ambient temperature about 29° C. It was then subjected to clari-flocculation using 10 ppm of flocculent polyacrylamide Mol. wt. 7 million, available locally as Rishabh/Magnafloc. Thereafter it was treated with 5 gm/l of activated carbon confirming to BIS No 2752, and filtered. After the clari-flocculation, cleaned weak phosphoric acid was treated with 0.2 ml/l of hydrogen peroxide 50% by wt., at room temperature 29° C. for 1–3 minutes. The redox potential of this acid was found to be 460 mV.

b. First cycle of extraction

The pretreated weak phosphoric acid as aqueous phase was extracted in 6 stages at 0.25 l/min in a counter current manner with the extracting solvent-I at 0.1 l/min as organic phase. The aqueous to organic flow ratio was maintained at 2.5. The extract was stripped at 30° C. using 11.3 M industrial phosphoric acid (See Table 2) (6.25 ml/min) to which was added metallic iron (8 g/l) providing redox potential of an emf of 65 mV, in 6 number of counter current stages at organic to aqueous phase ratio of 16:1.

c. Second cycle of extraction

The stripped acid (2.5 l) was diluted with water (2.8 l) to bring it to the acid density of 1.28 g/ml with $P_2O_5$ level of 29.4%, comparable as that of the clari-flocculated phosphoric acid used in the first cycle for extraction. It was treated with 1 ml/l of hydrogen peroxide (50% wt by wt.) at 29° C. for 1–3 minutes, redox potential 540 mV and extracted with 1.9 l Solvent-II, aqueous phase to organic phase ratio of 2.8 in 8 number of counter current stages; the second cycle extract was scrubbed at 30° C. with 380 ml of 5.5 M sulfuric acid in 8 stages at organic to aqueous phase ratio of 5:1. The entire quantity of the sulfuric acid scrubbed extract (1.9 l) was stripped with 16% wt./vol. sodium carbonate solution, final volume of 180 ml, in organic to aqueous ratio of 10.6:1 to obtain a uranium bearing solution which also contained iron precipitate. The precipitate was filtered and washed, and washings combined with the filtrate.

d. Recovery of Uranium 500 ml of the combined solution containing 22.01-g/l uranium was mixed at room temperature ~29° C. with 40 ml of 12.5 M NaOH solution. This raised the pH to 12 and precipitated sodium diuranate. The precipitate was filtered and slurried in 100 ml of water and then 25 ml of 4 M sulfuric acid was added to it and the precipitate was dissolved. The insolubles were filtered out and the pH of the clear filtrate solution was adjusted to 3.5 using 8 ml of 12.5 M NaOH. After pH adjustment, 10 ml of $H_2O_2$ was added. This precipitated uranyl peroxide. It was filtered and the filter cake was washed with 150 ml of acidic water. The 130 ml filtrate and 150 ml washings analyzed 2 and 1 ppm uranium respectively. The air-dried cake weighed 16.8 gm with uranium content of 67% by wt. With respect to uranium in the feed acid for extraction and that in the stripping acid, this represented an overall recovery of 90.7% by wt. The purity of the uranium prepared was >99.9% by wt. The uranium peroxide filter cake after washings, was dried at 200° C. for 1 hr to obtain a uranium trioxide product.

EXAMPLE 7

Determination Of The Purity Of Uranium

The uranium peroxide produced by the process of present invention in different batches were analyzed for impurity contents by ICP (inductively coupled plasma) method and compared with a commercial product, used as a bench mark. The results are given in Table 12.

TABLE 12

Impurity Elements in Final Product - yellow cake (ppm)

| Code | Comm. | YC-0 | YC-1 | YC-2 | YC-3 | YC-4 | YC-5 |
|---|---|---|---|---|---|---|---|
| Y  | 80   | 3.8  | 6.3  | 5.1  | 1.5  | 2.8  | 5.8  |
| Gd | 29   | 1.6  | 1.3  | 1.3  | 0.66 | 0.74 | 1.1  |
| Ce | 72   | 3.9  | 5.4  | 5.8  | 2.9  | 5.6  | 4.3  |
| Dy | 33   | 0.7  | 4.9  | 3.6  | 0.98 | 2.0  | 4.2  |
| Eu | 2.8  | 0.2  | 0.19 | 0.16 | 0.08 | 0.13 | 0.13 |
| Sm | 18   | 4.4  | 1.7  | 1.7  | 0.98 | 1.5  | 1.5  |
| B  | 20.5 | 2.56 | 2.2  |      |      |      |      |

It would be well apparent from the above that the extractant combination of the invention, which is cost-effective, readily available and free of harmful/corrosive chemicals, provides for desired high yield of uranium with high purity.

EXAMPLE 8

Determination Of Stability Of The Solvent

In two parallel experiments, aliquots of solvent comprising 1.5 M D2EHPA+0.15 M TBP in refined kerosene were contacted with 5.23 M phosphoric acid at room temperature ~29° C. in a mixer in test-1and 11.3 M phosphoric acid at 60° C. in test-2, respectively for 15 days. Samples of the organic phases were withdrawn at intervals and a standard uranium extraction test was carried out. No detectable change in power was found during this period indicating good stability of the solvent. In another test 30 cycles of extraction and stripping were carried out, with each cycle consisting of extraction with 5.23 M phosphoric acid at room temperature 29° C. followed by stripping with 11.3 M phosphoric acid at 60° C. Again no deterioration in solvent quality and its ability to separate uranium was noted.

Importantly, the process of the invention thus provides for the efficient recovery of high purity uranium substantially free of rare earths from weak phosphoric acid and at the same time does not affect the quality of the phosphoric acid and fertilizers produced therefrom. This is achieved by way of a selective process of extraction including (a) selective synergistic extraction system involving a combination of D2EHPA-TBP (b)11–14 M phosphoric acid for stripping under reductive condition. In particular, the invention advantageously utilizes strong phosphoric acid for stripping the extract. This facilitates maintaining the fertilizer phosphoric acid plant free of contamination. The loaded-stripped acid could be diluted with water and re-extracted. Thus the two-cycle process with reductive stripping in first cycle that regenerates the solvent for re-use in extraction without deterioration in its quality and under conditions of stripping such that rare earths are also stripped along with uranium and re-extraction in second cycle with 5.5 M sulfuric acid scrubbing for separation of co-extracted rare earths.

The above selective combination of steps of uranium recovery from weak phosphoric acid in accordance with the invention thus provides for the following distinguishing advantages not known to the art.

i) Achieves high recovery of the uranium in phosphoric acid and gives high purity uranium peroxide.
ii) It is cost effective and at the same time avoids use of harmful chemicals.
iii) Provides for improvement in the fertilizer grade phosphoric acid in its environmental quality.
iv) Utilizes selective extractants which are easily available and also facilitates stripping the extractants completely and can be recycled, keeping the process costs low, an advantage over HF processes.
v) Maintains the stripped phosphoric acid after re-extraction suitable for use as a fertilizer free of harmful chemicals/contaminants.

We claim:

1. A process for recovery of uranium from aqueous fertilizer grade weak phosphoric acid comprising:
   first extracting aqueous fertilizer grade weak phosphoric acid with a solvent blend comprising 1 M to 1.6 M di(2-ethylhexyl)phosphoric acid (D2EHPA) and 0.1 M to 0.3 M tri-n-butyl phosphate (TBP) in refined kerosene, wherein the molar ratio of D2EHPA to TBP is 10:1 to 5:1 in the refined kerosene, to provide a first extract;
   reductive stripping for first extract with 11 M to 14 M phosphoric acid to provide loaded phosphoric acid;
   diluting the loaded phosphoric acid with water to the concentration of the aqueous fertilizer grade weak phosphoric acid to provide a diluted loaded phosphoric acid;
   oxidizing the diluted loaded phosphoric acid;
   second extracting the diluted loaded phosphoric acid with 1 M to 1.6 M D2EHPA and 0.1 M to 0.3 M TBP, wherein the molar ratio of D2EHPA to TBP is 10:1 to 5:1 in refined kerosene, to provide a second extract;
   scrubbing the second extract with 4.5 M–5.5 M sulfuric acid to provide a scrubbed second extract;
   stripping the scrubbed second extract with a solution of alkali carbonate to provide a stripped second extract; and
   recovering uranium values from the stripped second extract.

2. The process of claim 1, further comprising, before first extracting:
   cooling the aqueous fertilizer grade weak phosphoric acid,
   clari-flocculating the aqueous fertilizer grade weak phosphoric acid,
   treating the aqueous fertilizer grade weak phosphoric acid with activated carbon,
   oxidizing the aqueous fertilizer grad weak phosphoric acid, or 3. The process of claim 1, wherein the volume ratio of D2EHPA to TBP is 1:1 to 1:2 in the first extracting.

4. The process of claim 1, further comprising:
   treating the stripped second extract with alkali;
   collecting the resulting precipitate;
   dissolving the precipitate in 3 M to 4 M sulfuric acid to form a sulfuric acid solution;
   adjusting the pH of the sulfuric acid solution to 3.5;
   treating the sulfuric acid solution with hydrogen peroxide to precipitate uranium peroxide; and
   optionally, drying and recalcining the uranium peroxide at 180° C. to 220° C. to provide uranium oxide.

5. A process for recovery of uranium from aqueous fertilizer grade weak phosphoric acid comprising:
   pretreating the aqueous fertilizer grade weak phosphoric acid by cooling, clari-flocculating, treating with activated carbon, oxidizing, or combination thereof, to provide a pretreated phosphoric acid;
   first extracting the pretreated phosphoric acid with a solvent blend comprising 1 M to 1.6 M D2EHPA and 0.1 M to 0.3 M TBP in refined kerosene, wherein the molar ratio of D2EHPA to TBP is 10:1 to 5:1 in the refined kerosene and the volume of D2EHPA to TBP is 1:1 to 1:2, to provide a first extract;
   reductive stripping the first extract with 11 M to 14 M phosphoric acid to provide loaded phosphoric acid;
   second extracting the loaded phosphoric acid with a solvent blend comprising 1 M to 1.6 D2EHPA and 0.1 M to 0.3 M TBP in refined kerosene, wherein the molar ratio of D2EHPA to TBP is 10:1 to 5:1 in the refined kerosene and the volume of D2EHPA to TBP is1:1 to 1:2, to provide a second extract;
   scrubbing the second extract with 4.5 M–5.5 M sulfuric acid to provide a scrubbed second extract;
   stripping the scrubbed second extract with a solution of alkali carbonate to provide a stripped second extract;
   treating the stripped second extract with alkali to form a precipitate;
   collecting the precipitate;
   dissolving the precipitate in 3 M to 4 M sulfuric acid to form a sulfuric acid solution;
   adjusting the pH of the sulfuric acid solution to 3.5;
   treating the sulfuric acid solution with hydrogen peroxide to precipitate uranium peroxide; and
   optionally, drying and recalcining the uranium peroxide at 180° C. to 220° C. to provide uranium oxide.

6. The process of claim 5, further comprising:
   cooling the aqueous fertilizer grade weak phosphoric acid to 25° C. to 30° C.;
   adding a flocculating agent to the aqueous fertilizer grade weak phosphoric acid, the flocculating agent comprising a high molecular weight cationic polymer;
   separating the resulting precipitated solids from the aqueous fertilizer grade weak phosphoric acid to provide a clarified weak phosphoric acid;
   adding activated carbon to the clarified weak phosphoric acid;
   separating the activated carbon from the clarified weak phosphoric acid to provide a carbon-treated clarified weak phosphoric acid;
   oxidizing the carbon-treated weak phosphoric acid with an oxidizing agent comprising air, oxygen, sodium chlorate, or hydrogen peroxide, to provide a pretreated phosphoric acid having a redox potential of greater than 350 mV.

7. The process of claim 5, wherein the high molecular weight cationic polymer is polyacrylamide having molecular weight of $4 \times 10^6$ to $8 \times 10^6$ g/mol.

8. The process of claim 5, wherein:
the first extracting employs a ratio of pretreated phosphoric acid to solvent blend of 1:0.8 to 1:0.33 by volume;
the reductive stripping employs 11 M to 14 M industrial fertilizer grade phosphoric acid having iron content to provide a loaded phosphoric acid having a redox potential of less than 100 mV; and
the process further comprises:
separating the loaded phosphoric acid having a redox potential of less than 100 mV from the solvent blend to provide a recovered solvent blend;
recycling the recovered solvent blend;
providing the loaded phosphoric acid having a redox potential of less than 100 mV for second extracting.

9. The process of claim 5, wherein the second extracting comprises:
diluting the loaded phosphoric acid with water to provide a diluted loaded phosphoric acid having less than 30% by weight of $P_2O_5$;
oxidizing the diluted phosphoric acid to provide a diluted phosphoric acid having a redox potential of greater than 350 mV;
third extracting of the diluted phosphoric acid having redox potential greater than 350 mV with the same solvent blend employed in the second extracting, such that the second and third extracting provides a volume ratio of the diluted phosphoric acid to the combined second and third extraction solvent blend of 1:0.125 to 1:1;
scrubbing of the third extract with a volume of 4.5 M–5.5 M sulfuric acid that is ⅓ to ⅕ of a volume employed to scrub the second extract, at 25° C.–30° C., and for 0.5–3 minutes to provide a scrubbed third extract;
stripping the scrubbed third extract with a volume of 10% wt/vol–20% wt/vol alkali carbonate that is ½ to ¹/₁₀ of a volume of alkali carbonate solution employed to strip the second extract, to provide a stripped third extract; and
separating precipitated iron hydroxides from the stripped third extract to provide a sodium carbonate solution containing uranium values.

10. The process of claim 9, wherein the ratio of the diluted phosphoric acid to the combined second and third extracts is from 1:0.25 to 1:0.5 by volume.

11. The process of claim 5, further comprising:
contacting the stripped second extract with a solution of 40%–50% by weight of sodium hydroxide;
separating precipitated sodium diuranate;
dissolving the sodium diuranate precipitate with one part by volume of 3 M–4 M sulfuric acid to one part by volume of precipitate to form a sulfuric acid composition;
adding a 10 wt-% to 20 wt-% composition of sodium hydroxide or ammonium hydroxide to the sulfuric acid composition to bring the pH of the sulfuric acid composition to about 3.5;
adding 25 vol-% to 50 vol-% hydrogen peroxide to pH adjusted sulfuric acid composition in an amount that is 10–20% excess over the stoichiometric amount;
collecting precipitated uranium peroxide; and
optionally, converting uranium peroxide to uranium trioxide by heating the uranium peroxide to 180° C. to 250° C. for 15–60 minutes.

12. The process of claim 5, wherein the solvent blend comprises 1.5 M D2EHPA and 0.2 M TBP in refined kerosene.

13. The process of claim 5, wherein either or both of the first and second extractions are counter current extractions done with number of stages from 6–10.

14. The process of claim 13, wherein the number of stages is 8.

15. The process of claim 5, wherein:
stripping of the first extract comprises counter current stripping with 6–10 stages; and
stripping of the second extract comprises counter current stripping with 2–4 stages.

16. The process of claim 15, wherein:
stripping of the first extract comprises counter current stripping with 6–8 stages; and
stripping of the second extract comprises counter current stripping with 2–3 stages.

17. The process of claim 5, wherein:
first extracting comprises counter current extracting in eight stages with 1.5 M D2EHPA and 0.2 M TBP; and
reductive stripping the first extract employs six stages, at 50°–60° C., with 11 M–14 M industrial $H_3PO_4$ containing $Fe^{2+}$ ions, such that the resulting loaded phosphoric acid has a redox potential of less than 100 mV.

18. The process of claim 5, further comprising:
diluting the loaded phosphoric acid to provide a diluted phosphoric acid;
oxidizing the diluted phosphoric acid with hydrogen peroxide; and
wherein second extracting comprises extracting the oxidized diluted phosphoric acid composition with the same solvent blend as used in the first extracting.

19. The process of claim 5, wherein the alkali carbonate solution comprises sodium carbonate, potassium carbonate, ammonium carbonate, or mixture thereof.

20. The process of claim 5, wherein:
the ratio of volume of pretreated phosphoric acid to volume of solvent blend employed in first extracting is from 0.33:1 to 0.5:1; and
reductive stripping is carried out at 50° C.–55° C. with 11 M–12 M industrial phosphoric acid having added iron such that the resulting loaded phosphoric acid has a redox potential of less than 90 mV.

21. The process of claim 5, further comprising:
diluting the loaded phosphoric acid with water to provide $P_2O_5$ of 25 wt %–30 wt % and to provide a diluted loaded phosphoric acid;
adding hydrogen peroxide to the diluted loaded phosphoric acid to provide a diluted loaded phosphoric acid having a redox potential of greater than 350 mV;
oxidizing the diluted loaded phosphoric acid having a redox potential of greater than 350 mV to form an oxidized diluted loaded phosphoric acid;
providing a ratio of oxidized diluted loaded phosphoric acid to the solvent blend used in the second extracting of 1:0.25 to 1:0.5 by volume;
second extracting in counter current manner in 8 stages;
scrubbing of the second extract with ¼ to ⅕ volume, based on the volume of the second extract, of 4.5 M–5.5 M sulfuric acid at 25° C.–30° C. for 0.5–3 minutes contact; and
stripping the scrubbed second extract with the ½ to ¹/₁₀ volume, based on volume of the second extract, of 10 wt/vol % to 15 wt/vol % composition of alkali carbonate.

22. The process of claim 5, wherein the hydrogen peroxide is employed at 10%–20% over the stoichiometric requirement; and optionally, further comprising drying the uranium peroxide 200° C.–210° C. for 30 to 45 minutes to form a uranium trioxide.

23. The process of claim 5, comprising conducting all or part of the process batchwise or continuously.

24. A process for recovery of uranium from aqueous fertilizer grade weak phosphoric acid comprising:
pretreating the aqueous fertilizer grade weak phosphoric acid by cooling, clari-flocculating, treating with activated carbon, oxidizing, or combination thereof, to provide a pretreated phosphoric acid;
first extracting the pretreated phosphoric acid with a solvent blend comprising 1 M to 1.6 M D2EHPA and 0.1 M to 0.3 M TBP in refined kerosene, wherein the molar ratio of D2EHPA to TBP is 10:1 to 5:1 in the refined kerosene, to provide a first extract;
reductive stripping the first extract with 11 M to 14 M phosphoric acid to provide loaded phosphoric acid;
second extracting the loaded phosphoric acid with 1 M to 1.6 M D2EHPA and 0.1 M to 0.3 M TBP, wherein the molar ratio of D2EHPA to TBP is 10:1 to 5:1 in refined kerosene, to provide a second extract;
scrubbing the second extract with 4.5 M–5.5 M sulfuric acid to provide a scrubbed second extract;
stripping the scrubbed second extract with a solution of alkali carbonate to provide a stripped second extract;
treating the stripped second extract with alkali to form a precipitate;
collecting the precipitate;
dissolving the precipitate in 3 M to 4 M sulfuric acid to form a sulfuric acid solution;
adjusting the pH of the sulfuric acid solution to 3.5;
treating the sulfuric acid solution with hydrogen peroxide to precipitate uranium peroxide; and
optionally, drying and recalcining the uranium peroxide at 180° C. to 220° C. to provide uranium oxide.

* * * * *